Nov. 1, 1960 H. JOHNSON 2,958,496
HOLDERS FOR NAPKINS AND TISSUES
Filed Nov. 10, 1958
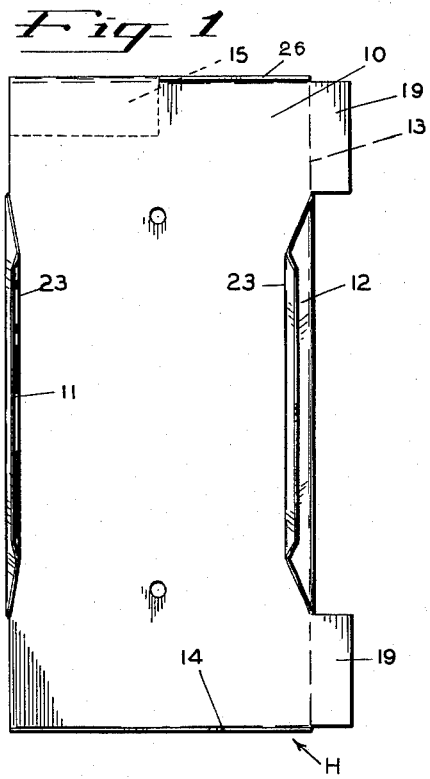
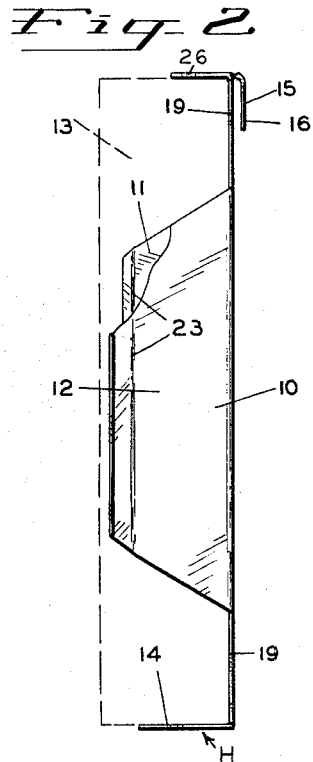
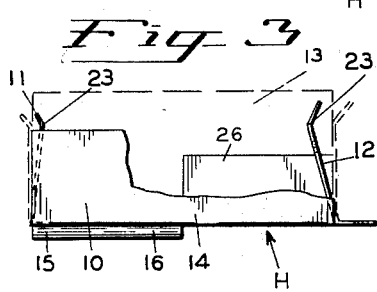
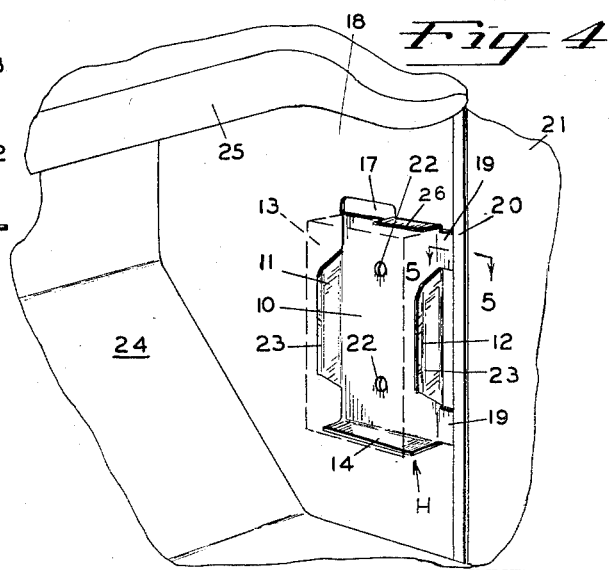
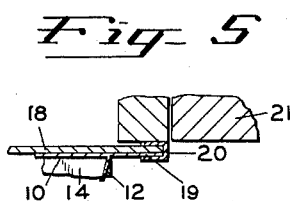
INVENTOR.
HAWKIN JOHNSON
BY
*Kimmel & Crowell*
ATTORNEYS

United States Patent Office 2,958,496
Patented Nov. 1, 1960

2,958,496
HOLDERS FOR NAPKINS AND TISSUES

Hawkin Johnson, 5040 SE. Jackson, Milwaukie, Oreg.

Filed Nov. 10, 1958, Ser. No. 772,876

1 Claim. (Cl. 248—223)

The present invention relates to holders for napkins and tissues, and particularly to such a holder to be installed in motor vehicles and the like.

The primary object of the invention is to provide a holder for napkins and tissue cartons that can be easily attached to the inner wall panels of motor vehicles, preferably forward of the door adjacent and above the floor boards and under the instrument cowl on the right side of the vehicle.

Another object of the invention is to provide a holder of the class described above having integral clamp portions for holding napkin and tissue cartons with the holder having integral tongues formed thereon for penetrating the panel, and to be inserted under the trim of the panel for mounting the holder to the panel of the vehicle.

Other objects and advantages will become apparent in the following specification when considered in light of the attached drawings, in which:

Figure 1 is a front elevational view of the invention;

Figure 2 is a side view, looking towards the left of Figure 1;

Figure 3 is a bottom plan view of the structure shown in Figure 1, partially broken away for convenience of illustration;

Figure 4 is a perspective view of the invention which illustrates the holder secured to the interior of the motor vehicle; and Figure 5 is an enlarged fragmentary sectional view, taken on line 5—5 of Figure 4, looking in the direction of the arrows.

Referring now to the drawings in detail wherein like reference characters indicate like parts throughout the several figures, the reference character H indicates generally a holder for napkin and tissue cartons.

The holder for napkin and tissue cartons H is formed from a generally rectangular one piece sheet 10. Bent forwardly from opposite sides of the sheet 10 are clips 11 and 12 arranged to clamp therebetween a tissue box 13, indicated by broken lines.

The lower end of the sheet 10 has an outwardly extending flange 14 integrally formed theron to support the weight of the carton 13.

The upper edge of the sheet 10 is provided with a rearwardly projecting hook 15 having its lower end 16 terminating in rearwardly spaced relation to the sheet 10 and is adapted to pass through an opening 17 formed in the panel 18 of the body of the vehicle. Tongues 19 also are formed from the sheet 10 and extend outwardly therefrom lying in the same plane as the sheet 10, as indicated particularly in Figures 1, 3, 4 and 5. The tongues 19 are adapted to engage in the channel-like trim 20 of the motor vehicle which supports the panel 18 just forwardly of the door 21 of the body of the vehicle.

The holder H when required can be further secured to the panel 18 by screws 22, or in some cases the screws 22 may provide the entire support for the holder H.

The clips 11 and 12 are biased to assume the position shown in Figure 3 normally until the carton 13 is forced therebetween, at which time the clips 11 and 12 would take the broken line position shown in Figure 3, maintaining a pressure against the side of the carton 13, holding the same within the device.

The clips 11 and 12 are bent out slightly to provide flared lips 23 to facilitate the engagement of the carton 13 therebetween.

It will be noted in Figure 4 that the location of the holder H is just forward of the door 21 of the vehicle above the floor boards 24, and under the instrument panel 25. The holder H will support the regular full size carton of napkins and tissues so that they can be replenished from normal stocks.

The sheet 10 is provided with an integral forwardly extending bracket 26 formed on a portion of the upper edge thereof adjacent the hook 15. The flange 26 is parallel to the bracket 14 and is arranged to engage the upper end of the carton 13.

Having thus described the preferred embodiment of the invention, it should be understood that numerous structural modifications and adaptations may be resorted to without departing from the scope of the appended claim.

What is claimed is:

A holder for generally rectangular napkin and tissue cartons comprising a generally rectangular flat sheet, a pair of elongated clips integrally formed on and extending along a major portion of the opposite side edges of said flat sheet and extending outwardly therefrom in opposed relation, said clips being spring biased toward each other, an outwardly flared lip integrally formed on each of said clips, a pair of flanges integrally formed on opposite ends of said sheet and extending outwardly therefrom in spaced apart parallel relation, a hook integrally formed on said sheet at one end thereof adjacent to one of said flanges, said hook having an end thereof terminating in spaced relation to said sheet, and a pair of flat tongues integrally formed on said sheet and extending outwardly from one side edge thereof and lying in the plane of said sheet for engagement in a channel frame support.

References Cited in the file of this patent

UNITED STATES PATENTS

| 1,570,052 | Erwin | Jan. 19, 1926 |
| 2,395,592 | Tierney | Feb. 26, 1946 |
| 2,488,326 | Pratt | Nov. 15, 1949 |